(12) United States Patent
Kao

(10) Patent No.: US 6,979,114 B2
(45) Date of Patent: Dec. 27, 2005

(54) LIQUID CRYSTAL DISPLAY AND LIGHT SOURCE DEVICE THEREOF

(75) Inventor: Hung Chen Kao, Taipei (TW)

(73) Assignee: Hannstar Display Corp., (TW)

( * ) Notice: Subject to any disclaimer, the term of this patent is extended or adjusted under 35 U.S.C. 154(b) by 48 days.

(21) Appl. No.: 10/743,822

(22) Filed: Dec. 24, 2003

(65) Prior Publication Data

US 2004/0207996 A1 Oct. 21, 2004

(30) Foreign Application Priority Data

Apr. 18, 2003 (TW) .............................. 92109314 A

(51) Int. Cl.⁷ .................... G02F 1/1333; G02F 1/1335; F21V 7/04; F21V 8/00
(52) U.S. Cl. ........................ 362/633; 362/29; 362/613; 349/58
(58) Field of Search ........................ 362/31, 633, 29, 362/613; 349/58.7, 58

(56) References Cited

U.S. PATENT DOCUMENTS

| 6,407,781 B2 | 6/2002 | Kitada |
| 6,417,833 B1 | 7/2002 | Takemoto |
| 6,609,807 B2 * | 8/2003 | Torihara et al. ............... 362/31 |
| 2002/0113918 A1 * | 8/2002 | Hiratsuka et al. ............. 349/65 |

* cited by examiner

Primary Examiner—Sandra O'Shea
Assistant Examiner—James W. Cranson, Jr.

(57) ABSTRACT

A liquid crystal display comprises a liquid crystal panel for displaying images, a first frame, a second frame, and a first optical component. The first frame receives the liquid crystal panel. The second frame has a plurality of lamps for transmitting light to the liquid crystal panel. The first optical component is disposed on the first frame and between the second frame and the liquid crystal panel. The second frame is detachable from the first frame.

20 Claims, 4 Drawing Sheets

# LIQUID CRYSTAL DISPLAY AND LIGHT SOURCE DEVICE THEREOF

CROSS REFERENCE TO RELATED APPLICATION

This application claims the priority benefit of Taiwan patent application serial No. 092109314, filed on Apr. 18, 2003, and the full disclosure thereof is incorporated herein by reference.

BACKGROUND OF THE INVENTION

1. Field of the Invention

The present invention generally relates to a back light module of a liquid crystal display, and more particularly to a back light module of a liquid crystal display (LCD) having a housing which can be easily detached.

2. Description of the Related Art

Due to the advance of electronic technology, especially for the popularity of portable electronic products, the requirements of light, compact and low-energy consuming display are gradually increasing. With the advantages of low-energy consuming, low-heat dissipation, light weight and non-luminescence display, liquid crystal displays (LCD) have been widely used in the electronic products and even have replaced the traditional CRT displays.

Referring to FIG. 1, it depicts a conventional liquid crystal display (LCD). In general, the liquid crystal display includes a liquid crystal panel 10 which has two substrates and liquid crystal material sealed therebetween, a back light module 20 disposed under the liquid crystal display panel 10, and a front frame 11.

The back light module 20 is used to distribute the light transmitted from a light source uniformly over the surface of the liquid crystal display panel 10. There are several kinds of back light modules for the liquid crystal display, such as a direct back light type (or direct type) and an edge light type. For the liquid crystal display in large dimensions, the back light module of the direct type is widely used because of its easy installation and its low cost.

The back light module 20 of the direct type, as shown in FIG. 2, includes a housing 70 which has a reflective sheet 60 disposed on the bottom surface of the housing 70, lamps 50, such as a fluorescence cathode tube, disposed at the bottom portion of the housing 70, a diffuser plate 40 disposed on the upper surface of the housing 70, and a plurality of optical films 30, such as a prism sheet and a diffuser sheet, disposed on the diffuser plate 40. The lamps 50 are spaced apart from each other and disposed within the display area of the liquid crystal panel 10, not shown. Since the light source, i.e. the lamps 50, is a linear light source, the lamps 50 cannot provide light evenly illuminating the liquid crystal panel 10. Therefore, the diffuser plate 40 and the optical films 30 have to be provided and disposed between the lamps 50 and the liquid crystal panel 10 so as to form a panel light source device having uniform luminance.

Many back light modules have been disclosed in the prior art, such as those disclosed in U.S. Pat. No. 6,407,781 B2 issued to Kitada on Jun. 18, 2002 and in U.S. Pat. No. 6,417,833 B1 issued to Takemoto et al. on Jul. 9, 2002, which are all incorporated herein by reference.

For the well-known technology, the lifetime of the lamp of the back light module is the shortest of all the parts or elements of the liquid crystal display. If the lamp malfunctions, the frame, the liquid crystal panel, the back light module frame, the optical film, and the diffusing sheet of the liquid crystal display have to be detached from the liquid crystal display to replace the lamp. This procedure, which is difficult and complex, must be carried out in the cleaning room, or the liquid crystal panel or the optical film will be contaminated and the liquid crystal display will be degraded. Further, the liquid crystal display in large dimensions will be unable to be serviced on site without the cleaning room.

Accordingly, there exists a need for a liquid crystal display having detachable lamps for facilitating the service and the repair.

SUMMARY OF THE INVENTION

It is an object of the present invention to provide a liquid crystal display having a detachable frame for receiving lamps, thereby facilitating the subsequent service and the repair.

In order to achieve the above object, the present invention provides a liquid crystal display which comprises a liquid crystal panel for displaying images, a first frame, a second frame, and a first optical component. The first frame receives the liquid crystal panel. The second frame has a plurality of lamps for transmitting light to the liquid crystal panel. The first optical component is disposed on the first frame and between the second frame and the liquid crystal panel. The second frame is detachable from the first frame.

The liquid crystal display according to the present invention is provided with a detachable frame, which can be referred to as a light source device or a light box, for receiving a plurality of lamps. While the lamp needs to be replaced, the frame or the light box can be detached from the liquid crystal display so as to obtain access to the lamps.

BRIEF DESCRIPTION OF THE DRAWINGS

Other objects, advantages, and novel features of the invention will become more apparent from the following detailed description when taken in conjunction with the accompanying drawing.

DESCRIPTION OF THE EMBODIMENT

Figure 1:
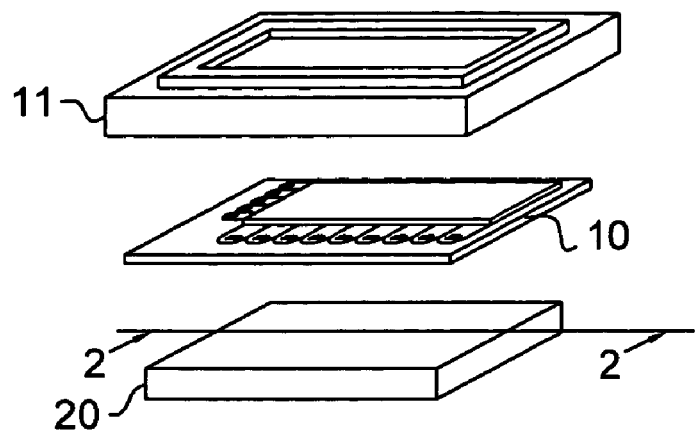
FIG. 1 is a schematic perspective exploded view of a liquid crystal display in the prior art.
Figure 2:
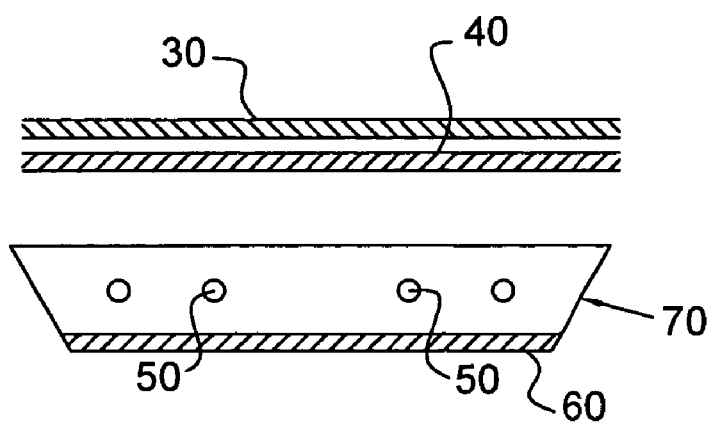
FIG. 2 is a schematic cross sectional view of a back light module of the direct type along the line 2—2 shown in FIG. 1.
Figure 3:
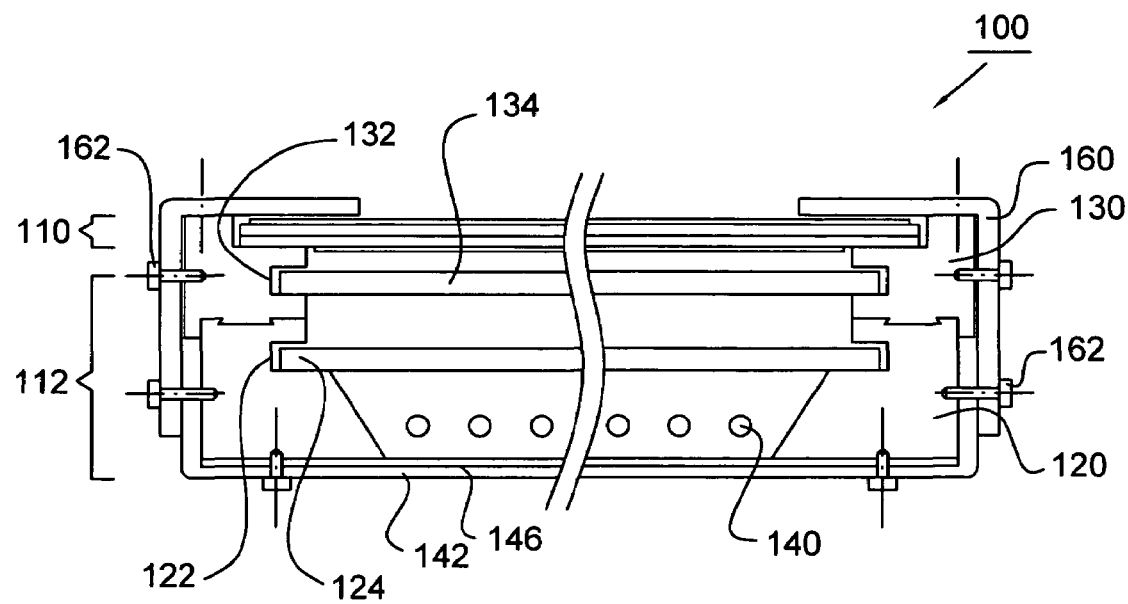
FIG. 3 is a schematic longitudinal cross sectional view of a liquid crystal display according to an embodiment of the present invention.
Figure 4:
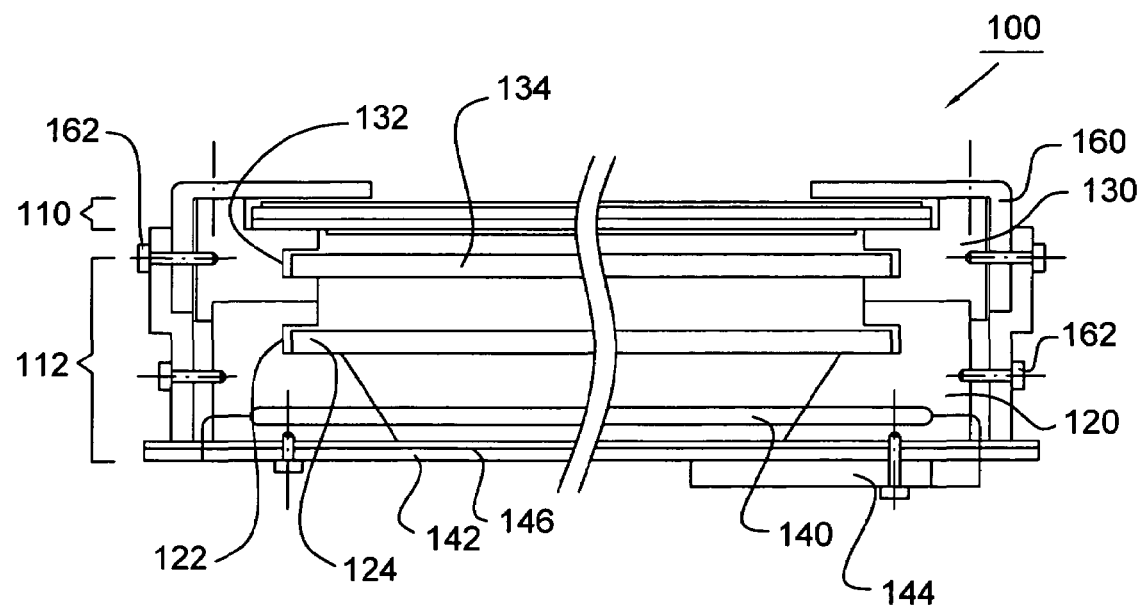
FIG. 4 is a schematic transversal cross sectional view of the liquid crystal display shown in FIG. 3.

Referring to FIGS. 3 and 4, they depict a liquid crystal display 100 according to an embodiment of the present invention. The liquid crystal display 100 comprises a liquid crystal panel 110 for displaying images, a back light module 112 for transmitting light to the liquid crystal panel 110, and a front frame 160 for fixing the back light module 112 and the liquid crystal panel 110 together. The liquid crystal panel 110 includes two print circuit boards (PCBs), not shown, for transmitting the control signals and the driving signals to the liquid crystal panel 110.

The back light module 112 includes a first frame 130 and a second frame 120 both of which are substantially rectangular corresponding to and abutting the liquid crystal panel 110. The first frame 130 is provided with a first slot 132 therein for mounting a first optical component 134. It will be apparent to those skilled in the art that the first optical component 134 can comprise a plurality of optical films, such as a prism film and diffusing film, and a diffuser plate. The first optical component 134 is used for further evenly diffusing the light. For example, the prism sheet is commercially available from 3M™ Company of St. Paul Minn. under the trade name Brightness Enhancement Film series for gathering the light in the direction perpendicular thereto.

A housing 142 is attached on the second frame 120 for forming a cavity to receive a plurality of lamps 140. The inside of the housing 142 and the second frame 120 is covered with a reflector 146 for reflecting the light transmitted from the lamps 140. The second frame 120 is provided with a second slot 122 disposed therein for mounting a PMMA plate or a second optical component 124, such as a diffuser plate. An inverter 144 is connected to the lamps 140 for supplying the lamps 140 with electric power. Generally, the lamp 140 can be a cold cathode fluorscent lamp (CCFL).

Figure 5:
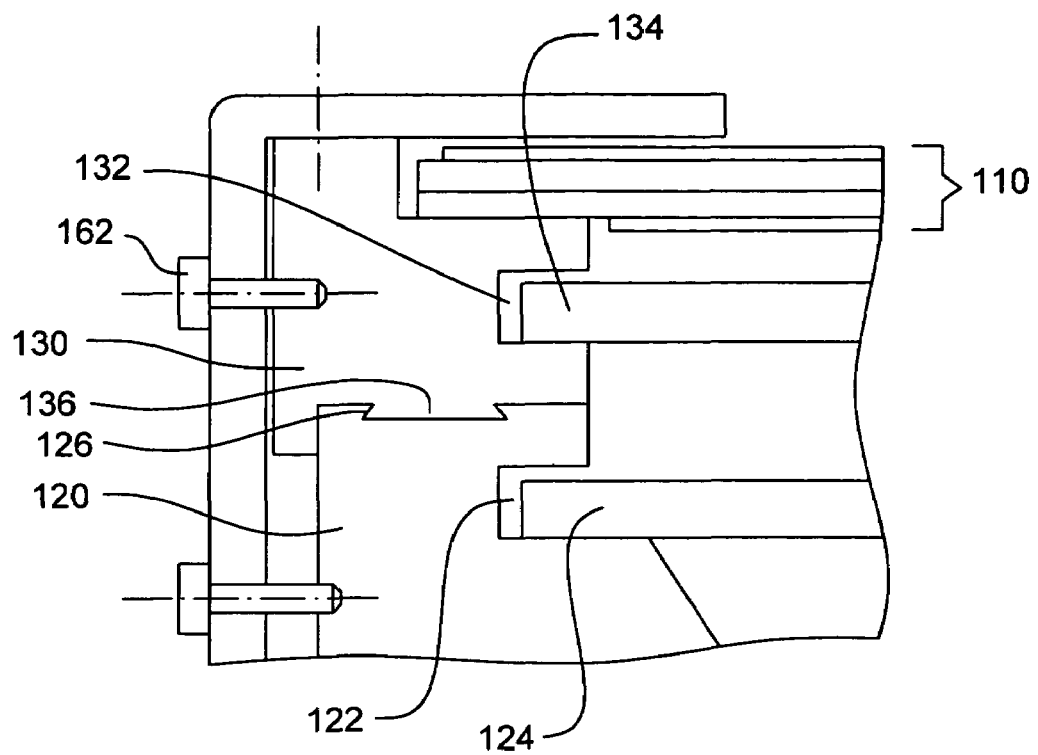
FIG. 5 is a schematic partial enlarged cross sectional view of the liquid crystal display shown in FIG. 3.

As shown in FIG. 5, a pair of slidable snap devices are disposed between the second frame 120 and the first frame 130, and comprises a tenon or a neck protrusion 136 and a mortise or a neck groove 126. The neck protrusion 136 and the neck groove 126 are disposed on the corresponding sides of the first frame 130 and the second frame 120, respectively.

As shown in the drawing, the pair of the neck protrusion 136 and the neck groove 126 are dovetailed or frusta-triangular in shape. The neck protrusion 136 is inserted into and slidable within the neck groove 126. However, the neck protrusion 136 cannot be detached directly from the neck groove 126.

During assembly, the liquid crystal panel 110 and the first optical component 134 are attached to the first frame 130. The second optical component 124, the housing 142, and the lamps 140 are attached to the second frame 120. Then, the neck protrusion 136 of the first frame 130 is inserted into the neck groove 126 of the second frame 120, and slid to be in position. The front frame 160 is disposed outside the second frame 120 and the first frame 130, and the second frame 120 and the first frame 130 can be fixed to the front frame 160 by a plurality of fasteners, such as bolts 162.

While the lamp of the liquid crystal display 100 malfunctions, an operator can unscrew the bolts 162, and slide out the second frame 120 in relation to the first frame 130 along the neck groove 126 and the neck protrusion 136 so as to detach the second frame 120 for replacing the lamps 140, and then complete the service or repair of the back light module 112 of the liquid crystal display 100. Since the liquid crystal panel 110 is substantially covered or sealed with the first optical component 134, the liquid crystal panel 110 will not be contaminated by the particles suspended in the atmosphere. It will be apparent to those skilled in the art that it is critical to prevent the contamination of the liquid crystal 110. Further, the second frame 120 and the first frame 130 can be made of plastic.

It will be apparent to those skilled in the art that the shape of the pair of the neck protrusion and the neck groove is not limited to illustrated dovetail or frusta-triangle. Other paired mechanism with neck can be used. Obviously, the neck protrusion can be disposed on the second frame and the neck groove can be disposed on the first frame.

Figure 6:
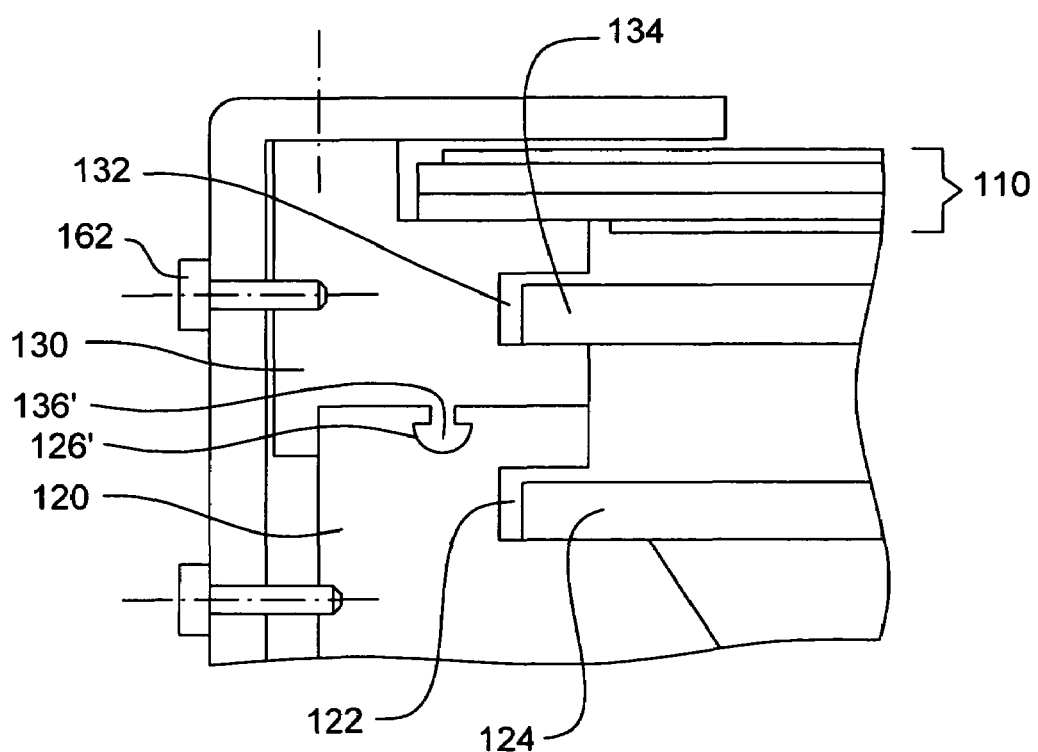
FIG. 6 is a schematic partial enlarged cross sectional view of a pair of a neck protrusion and a neck groove according to another embodiment of the present invention.

Now referring to FIG. 6, it depicts a pair of slidable snap devices according to another embodiment of the present invention, which comprises a neck protrusion 136' and a neck groove 126'. The pair of the neck protrusion 136' and the neck groove 126' are provided with a hemispheric portion and a neck portion. The neck protrusion 136' also can be inserted into and slidable within the neck groove 126'

Figure 7:
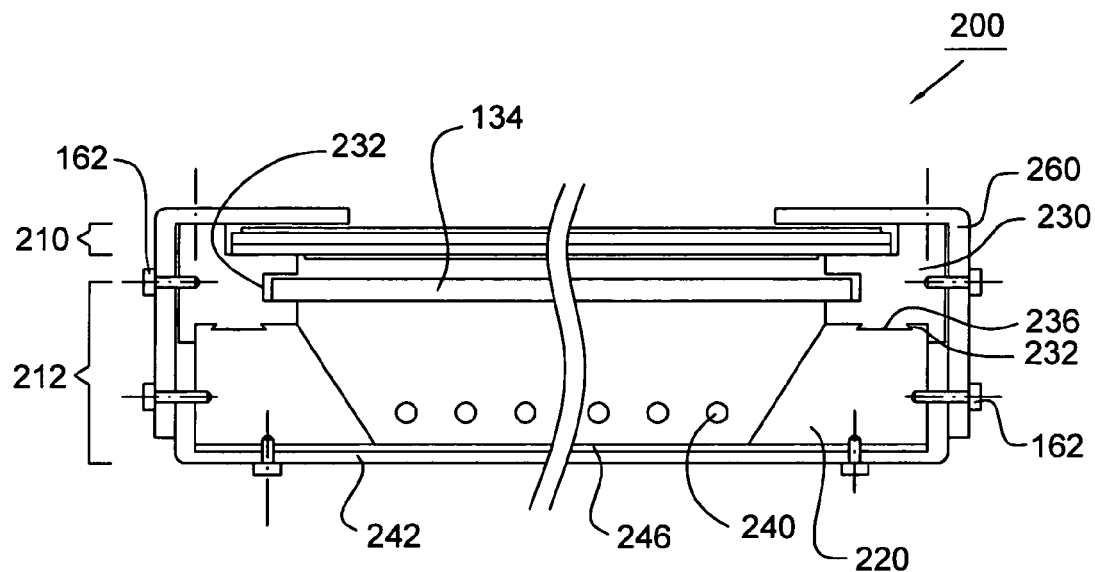
FIG. 7 is a schematic longitudinal cross sectional view of a liquid crystal display according to another embodiment of the present invention.
Figure 8:
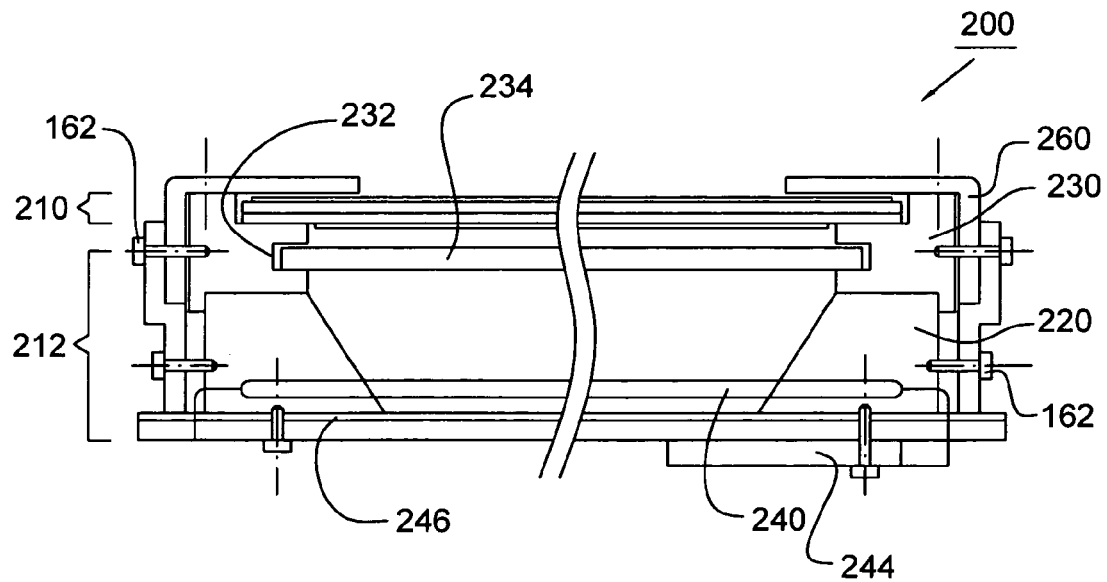
FIG. 8 is a schematic transversal cross sectional view of the liquid crystal display shown in FIG. 7.

Now referring to FIGS. 7 and 8, they depict a liquid crystal display 200 according to another embodiment of the present invention. The liquid crystal display 200 is generally similar to the liquid crystal display 100 wherein the similar elements are designated with the similar reference numerals. A second frame 220 of the liquid crystal display 200 is not provided with any optical component, diffuser plate or sheet, optical components 234 include all of the optical films which are installed into the liquid crystal display 200, and are mounted into a slot 232 of the first frame 230. In this arrangement, an operator can obtain further easy access to the lamps 240.

As indicated hereinabove, the liquid crystal display according to the present invention is provided with a detachable frame, which can be referred to as a light source device or a light box, for receiving a plurality of lamps. While the lamp needs to be replaced, the frame or the light box can be detached from the liquid crystal display so as to obtain access to the lamps.

For the purpose of description without any intent to limit the present invention, the terms "the neck protrusion" and "the neck groove," as being used herein, are intended to denote any protrusion and groove which are individually provided with a relatively narrow portion and which are slidable and snapped with each other. As described hereinabove, the neck protrusion can be a dovetailed or frusta-triangular in shape, and has a broad bottom portion and a narrow portion.

Obviously, the feature of the present invention is that a detachable light source device or light box is provided to facilitate the replacement of the lamp, and thus the pair of the slidable snap members, i.e. the neck protrusion and the neck groove, are not essential. The neck protrusion and the neck groove are provided to further facilitate the assembly and the detachment of the liquid crystal display, but not to limit the present invention.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A back light module for a liquid crystal display having a liquid crystal panel, said backlight module comprising:
   a first frame;
   a second frame detachably coupled with the first frame, wherein the first frame and the second frame are slidable relative to each other;
   a plurality of lamps disposed in the second frame for transmitting light; and
   a first optical component disposed on the first frame, wherein the first frame is to be disposed between the second frame and the liquid crystal panel.

2. The back light module as claimed in claim 1, further comprising:

a neck protrusion disposed on one of the first frame and the second frame; and a neck groove paired with the neck protrusion and disposed on the other one of the first frame and the second frame;

wherein the first frame and the second frame are coupled with and slidable relative to each other by means of the neck protrusion and the neck groove.

3. The back light module as claimed in claim 2, wherein the neck protrusion and the neck groove are dovetailed in shape.

4. The back light module as claimed in claim 2, wherein each of the neck protrusion and the neck groove is provided with a hemispheric portion and a neck portion.

5. The back light module as claimed in claim 1, wherein the first optical component comprises a plurality of optical films and a diffuser plate.

6. The back light module as claimed in claim 5, wherein the optical films comprises a prism film.

7. The back light module as claimed in claim 5, wherein the optical films comprises a diffuser film.

8. The back light module as claimed in claim 1, wherein the first frame further comprises a first slot for receiving the first optical component.

9. The back light module as claimed in claim 1, wherein the second frame further comprises a second optical component.

10. The back light module as claimed in claim 9, wherein the second frame further comprises a second slot for receiving the second optical component.

11. The back light module as claimed in claim 9, wherein the second optical component comprises a diffuser plate.

12. A liquid crystal displays, comprising:
a liquid crystal panel for displaying images;
a first frame receiving the liquid crystal panel;
a second frame detachably coupled with the first frame and having a plurality of lamps for transmitting light to the liquid crystal panel, wherein the first frame and the second frame are slidable relative to each other; and
a first optical component disposed on the first frame, wherein the first frame is disposed between the second frame and the liquid crystal panel.

13. The liquid crystal display as claimed in claim 12, further comprising:
a neck protrusion disposed on one of the first frame and the second frame; and
a neck groove paired with the neck protrusion and disposed on the other one of the first frame and the second frame;
wherein the first frame and the second frame are coupled with and slidable relative to each other by means of the neck protrusion and the neck groove.

14. The liquid crystal display as claimed in claim 13, wherein the neck protrusion and the neck groove are dovetailed in shape.

15. The liquid crystal display as claimed in claim 13, wherein each of the neck protrusion and the neck groove is provided with a hemispheric portion and a neck portion.

16. The liquid crystal display as claimed in claim 12, wherein the first optical component comprises a plurality of optical films and a diffuser plate.

17. The liquid crystal display as claimed in claim 12, wherein the first frame further comprises a first slot for receiving the first optical component.

18. The liquid crystal display as claimed in claim 12, wherein the second frame further comprises a second optical component.

19. The liquid crystal display as claimed in claim 18, wherein the second frame further comprises a second slot for receiving the second optical component.

20. A back light module for a liquid crystal display that has a liquid crystal panel, said back light module comprising:
a first frame for supporting the liquid crystal panel;
a second frame;
at least one lamp disposed in the second frame;
a neck groove disposed on one of the first and second frames; and
a matching neck protrusion disposed on the other one of the first and second frames and in slidable engagement with the neck groove to couple the first and second frames together.

* * * * *